United States Patent
Nishida et al.

(10) Patent No.: US 6,587,775 B2
(45) Date of Patent: Jul. 1, 2003

(54) DRIVING FORCE CONTROL SYSTEM FOR FOUR-WHEEL DRIVE VEHICLES

(75) Inventors: Kenzo Nishida, Saitama-ken (JP); Norihisa Nihanda, Saitama-ken (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 74 days.

(21) Appl. No.: 09/824,802

(22) Filed: Apr. 4, 2001

(65) Prior Publication Data

US 2002/0002436 A1 Jan. 3, 2002

(30) Foreign Application Priority Data

Apr. 6, 2000 (JP) .................................. 2000-105465

(51) Int. Cl.$^7$ .............................................. G06F 19/00
(52) U.S. Cl. ........................ 701/89; 701/67; 701/69; 180/197; 180/244
(58) Field of Search .......................... 701/69, 67, 89; 180/197, 242, 244, 248, 249

(56) References Cited

U.S. PATENT DOCUMENTS

| | | | | |
|---|---|---|---|---|
| 4,754,835 A | * | 7/1988 | Stelter et al. | 180/248 |
| 5,341,298 A | * | 8/1994 | Singleton et al. | 180/197 |
| 5,594,648 A | * | 1/1997 | Nakaura | 180/244 |
| 5,752,211 A | * | 5/1998 | Takasaki et al. | 180/248 |
| 5,927,426 A | * | 7/1999 | Hall et al. | 180/249 |
| 6,213,242 B1 | * | 4/2001 | Rodrigues et al. | 180/249 |
| 2001/0027369 A1 | * | 10/2001 | Nishida et al. | 701/89 |
| 2002/0002433 A1 | * | 1/2002 | Matsuno | 701/67 |
| 2002/0003057 A1 | * | 1/2002 | Mori et al. | 180/248 |
| 2002/0046892 A1 | * | 4/2002 | Sakakiyama | 180/242 |

FOREIGN PATENT DOCUMENTS

JP    10-194002    7/1998

* cited by examiner

*Primary Examiner*—Gary Chin
(74) *Attorney, Agent, or Firm*—Armstrong, Westerman & Hattori, LLP

(57) ABSTRACT

A driving force control system for a four-wheel drive vehicle, which is capable of preventing occurrence of a tight-turn braking phenomenon by relatively simple construction to thereby reduce the manufacturing cost thereof, and at the same time, enhancing the response of slippage-eliminating control on main drive wheels, and stability of the vehicle. The 2/WD·ECU of the driving force control system controls electromagnetic clutches of a four-wheel drive vehicle having front wheels as main drive wheels and rear wheels as auxiliary drive wheels, whereby the LSD torque to be distributed to the rear wheels is controlled. More specifically, the front-wheel/rear-wheel slip ratio is determined from the average front wheel speed and the average rear wheel speed, and the left/right rear-wheel speed ratio and the front-wheel/rear-wheel slip ratio threshold are determined according to the rear wheel speeds, and a first LSD torque for use in calculation of the LSD torque is determined based on the difference between the front-wheel/rear-wheel slip ratio and the front-wheel/rear-wheel slip ratio threshold.

8 Claims, 8 Drawing Sheets

DRIVING FORCE CONTROL SYSTEM FOR FOUR-WHEEL DRIVE VEHICLES

BACKGROUND OF THE INVENTION

1. Field of the Invention

This invention relates to a driving force control system for a four-wheel drive vehicle, which controls driving forces of left and right auxiliary drive wheels distributed from the driving force of main drive wheels connected to an engine by controlling the engagement forces of left and right clutches for the left and right auxiliary drive wheels.

2. Description of the Related Art

Conventionally, a driving force control system of this kind has been proposed by the present assignee in Japanese Laid-Open Patent Publication (Kokai) No. 10-194002. This system is installed on a four-wheel drive vehicle (hereinafter referred to as "the vehicle") with front wheels as main drive wheels and rear wheels as auxiliary drive wheels. Further, the vehicle includes left and right electromagnetic clutches for connecting and disconnecting the respective left and right rear wheels to and from a propeller shaft, wheel speed sensors for detecting respective wheel speeds of the front and rear wheels, a steering angle sensor for detecting a steering angle of a steering wheel, a yaw rate sensor for detecting a yaw rate of the vehicle, and a lateral acceleration sensor for detecting a lateral acceleration of the vehicle. The driving force control system controls the engagement force of the left and right electromagnetic clutches based upon signals output from these sensors, thereby controlling the torque distributed to the left and right auxiliary drive wheels, i.e., the left and right rear wheels.

More specifically, if there occurs a difference in wheel speed between the front wheels and the rear wheels, i.e., if it is assumed that the front wheels are slipping, the engagement force of the left and right electromagnetic clutches is controlled according to the difference in wheel speed to properly distribute or allocate the torque to the left and right rear wheels, thereby controlling the vehicle to a four-wheel drive mode. Further, when it is detected that the vehicle is cornering with an oversteering tendency or with an understeering tendency, the engagement forces of the respective left and right clutches are decreased or increased independently of each other depending on the cornering conditions of the vehicle to thereby control the torque distributed to the left and right rear wheels such that the oversteering tendency or the understeering tendency can be eliminated.

According to the conventional driving force control system, when the vehicle corners or turns at a relatively low vehicle speed on a road surface having a high frictional resistance, with large engagement forces of the left and right electromagnetic clutches, so-called tight-turn braking can act on the vehicle due to the difference in wheel speed between the left and right rear wheels and the surface resistance of the road. When such a tight-turn braking phenomenon occurs, the cornering characteristics of the vehicle are degraded. The tight-turn braking phenomenon can be overcome by the same control method as mentioned above which is used in eliminating the oversteering or understeering tendency. However, this method necessitates the use of many sensors enumerated above, and results in an increase in manufacturing cost. Further, according to this method, the driving forces transmitted to the rear wheels are increased only after an actual slip of the front wheels occurs, which means that the response of slippage-eliminating control is not high.

SUMMARY OF THE INVENTION

It is an object of the present invention to provide a driving force control system for a four-wheel drive vehicle, which is capable of preventing occurrence of a tight-turn braking phenomenon by relatively simple construction to thereby reduce the manufacturing costs thereof, and at the same time, enhancing the response of slippage-eliminating control on main drive wheels and stability of the vehicle.

To attain the above object, the present invention provides a driving force control system for a four-wheel drive control vehicle including a pair of front wheels, a pair of rear wheels, an engine, a transmission for connecting one of the pair of front wheels and the pair of rear wheels to the engine, as main drive wheels, and left and right clutches for connecting another of the pair of front wheels and the pair of rear wheels to the main drive wheels, as left and right auxiliary drive wheels, respectively, the driving force control system controlling the engagement force of each of the left and right clutches to thereby control distribution of a driving force of the main drive wheels to the auxiliary left and right wheels.

The driving force control system according to the invention comprises:

wheel speed detection means for detecting wheel speeds indicative of respective rotational speeds of the front and rear wheels;

average wheel speed calculation means for calculating an average wheel speed of the main drive wheels and an average wheel speed of the auxiliary drive wheels, based on the detected wheel speeds;

first index calculation means for calculating a first index representative of a relative relationship in magnitude between the average wheel speed of the main drive wheels and the average wheel speed of the auxiliary drive wheels;

second index calculation means for calculating a second index representative of a relative relationship in magnitude between respective wheel speeds of the left and right auxiliary wheels; and clutch engagement force determination means for determining respective engagement forces of the left and right clutches, depending on a relative relationship in magnitude between the first index and the second index.

According to this driving force control system, the average wheel speed calculation means calculates an average wheel speed of the main drive wheels and an average wheel speed of the auxiliary drive wheels, based on the detected wheel speeds. Further, a first index representative of a relative relationship in magnitude between these average wheel speeds is calculated, and a second index representative of a relative relationship in magnitude between wheel speeds of the left and right auxiliary wheels is calculated. Then, the respective engagement forces of the left and right clutches are determined in dependence on a relative relationship in magnitude between the first index and the second index. Thus, the engagement forces of the left and right electromagnetic clutches are determined such that the resulting engagement forces reflect not only the relative relationship in magnitude between the average wheel speed of the main drive wheels and that of the auxiliary drive wheels but also the relative relationship in magnitude between the wheel speeds of the respective left and right auxiliary drive wheels. Therefore, even when a tight turn braking force acts on the vehicle when it is cornering at a relatively low speed on a road surface having a high frictional resistance, e.g., on a paved road surface, the engagement forces of the left and right clutches can be controlled such that the inner one of the rear wheels is inhibited from rotating, by the braking force, while the other is allowed to rotate by slip of the associated clutch. As a result, it is possible to prevent occurrence of tight turn braking. As described above, such advantageous effects as mentioned above can be obtained by omitting the use of sensors conventionally used, such as a steering angle sensor, a yaw rate sensor, and a lateral acceleration sensor, and instead using the wheel speed detection means alone, whereby manufacturing costs of the vehicle can be reduced.

Preferably, the driving force control system further includes average wheel acceleration-calculating means for calculating an average wheel acceleration of the main drive wheels and an average wheel acceleration of the auxiliary drive wheels based on the detected wheel speeds, and increasing correction means for increasing the engagement forces of the left and right clutches, when the calculated average wheel acceleration of the main drive wheels is larger than the calculated average wheel acceleration of the auxiliary drive wheels.

According to this preferred embodiment, when the calculated average wheel acceleration of the main drive wheels is larger than the calculated average wheel acceleration of the auxiliary drive wheels, i.e., when the main drive wheels are slipping, the engagement forces of the left and right clutches are increased. That is, the slippage-eliminating control of the main drive wheels is carried out depending on the relative relationship in magnitude between the acceleration of the main drive wheels and that of the auxiliary drive wheels. Because the relative relationship in magnitude between the acceleration of the main drive wheels and that of the auxiliary drive wheels represents a slipping condition of the main drive wheels on more of a real time basis than the difference between the wheel speed of the main drive wheels and that of the rear drive wheels, the response of the slippage-eliminating control can be enhanced compared with a case in which this control is started upon occurrence of a difference in wheel speed between the main drive wheels sand auxiliary drive wheels.

More preferably, the increasing correction means increases the engagement forces of the left and right clutches according to an extent by which the calculated average wheel acceleration of the main drive wheels exceeds the calculated average wheel acceleration of the auxiliary drive wheels.

Preferably, the driving force control system further includes vehicle speed calculation means for calculating a vehicle speed of the four-wheel drive vehicle based on the detected wheel speeds, and decreasing correction means for decreasing the engagement forces of the left and right clutches as the calculated vehicle speed increases.

According to this preferred embodiment, the engagement forces of the left and right clutches are decreased as the calculated vehicle speed increases, i.e., as the slippage of the main drive wheels is considered to be smaller. Therefore, as the vehicle speed increases, the driving force distributed to the auxiliary drive wheels is made smaller. In other words, as less amount of slip is decreased, the driving force of the auxiliary drive wheels is required. In accordance with this, the preferred embodiment decreases the driving force of the auxiliary drive wheels so that the driving status of the vehicle is made closer to the two-wheel drive mode. This allows the reduction of size of the overall driving system including the clutches. Further, because the driving status of the vehicle is made closer to the two-wheel drive mode as the vehicle speed increases, so that the resistance to rotations of the elements of the driving system can be made smaller, whereby the fuel economy can be improved.

Preferably, the driving force control system further includes vehicle acceleration-calculating means for calculating a vehicle acceleration of the four-wheel drive vehicle based on the driving force of the main drive wheels, and second decreasing correction means for decreasing the engagement forces of the left and right clutches as the calculated vehicle acceleration decreases.

According to this driving force control system, the vehicle acceleration is calculated based on the driving force demanded by the main drive wheels, and the engagement forces of the left and right clutches are decreased as the vehicle acceleration decreases. This makes it possible to decrease the engagement forces of the clutches when the acceleration is not required, e.g., in the case of the accelerator pedal having been released. Further, because the engagement forces of the clutches are decreased for correction based on the vehicle acceleration, differently from the prior art in which the engagement forces are calculated based on the vehicle speed, it is possible to obtain appropriate engagement forces commensurate with the acceleration of the vehicle. As a result, when the road surface resistance is small and the accelerator is not stepped on, it is possible to prevent the engagement forces of the left and right engagement forces from becoming larger than required by the acceleration of the vehicle. This makes it possible to prevent the auxiliary drive wheels from undergoing a slip.

More preferably, the drive force control system includes gear position detection means for detecting a gear position of the transmission, and the second decreasing correction means decreases the engagement forces of the left and right clutches as the detected gear position is one for a higher speed.

The above and other objects, features, and advantages of the invention will become apparent from the following detailed description taken in conjunction with the accompanying drawings.

DETAILED DESCRIPTION OF THE PREFERRED EMBODIMENT

The present invention will now be described in detail with reference to the drawings showing a preferred embodiment thereof.

Figure 1:
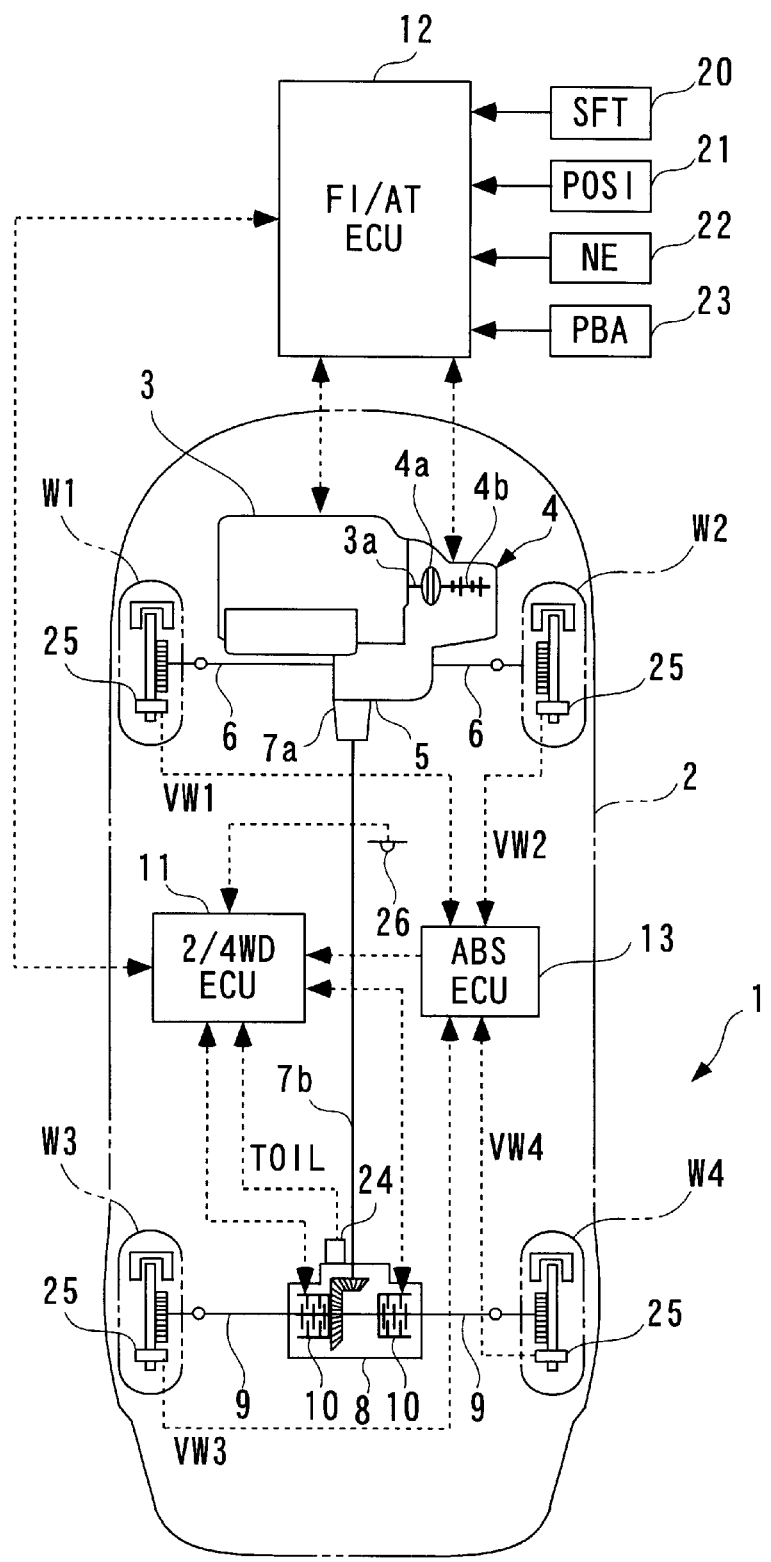
FIG. 1 is a view schematically showing the whole arrangement of a four-wheel drive vehicle incorporating a driving force control system according to an embodiment of the invention.

FIG. 1 schematically shows the entire arrangement of a four-wheel drive vehicle 2 incorporating a driving force control system 1 according to a preferred embodiment of the invention. As shown in the figure, the four-wheel drive vehicle 2 (hereinafter simply referred to as "the vehicle 2") includes an engine 3 transversely mounted in a front portion thereof and an automatic transmission 4 integrally arranged with the engine 3.

The automatic transmission 4 comprises a torque converter 4a, a shift lever, not shown, which is capable of selecting any one of the eight shift positions of "1, 2, 3, D4, D5, N, R, and P", and a gear mechanism 4b, partly shown, which can be shifted to any of six gear positions having respective change gear ratios, i.e., first to fifth speed gear positions and a reverse gear position. In the automatic transmission, when the shift position is set to "1" to "D5", and "R", the gear position of the automatic transmission 4 is switched to the first speed gear position, a range of the first and second speed gear positions, a range of the first to third speed gear positions, a range of the first to fourth speed gear positions, a range of the first to fifth speed gear positions, and the reverse gear position, respectively. In these gear positions, a higher speed gear position has a smaller change gear ratio set therefor.

The automatic transmission 4 has a gear position sensor 20 and a shift position sensor 21 mounted therein. The gear position sensor 20 detects a gear position, and delivers a signal SFT indicative of the detected gear position to an FI/AT·ECU 12, referred to hereinafter. More specifically, the gear position signal SFT assumes values (hereinafter referred to as "SFT values") of "1" to "5", and "6", for the first to fifth speed gear positions and the reverse gear position, respectively.

On the other hand, the shift position sensor 21 senses a selected shift position and delivers a shift position signal POSI indicative of the sensed shift position to the FI/AT·ECU 12. More specifically, the shift position signal POSI assumes a value of "1" for the shift position of "N" or "P", a value of "2" for the shift position of "R", and values of 3 to 7 for the respective shift positions of "1" to "D5" (hereinafter, the value of the shift position signal POSI will be referred to as "the POSI value"). Further, when the automatic transmission 4 is in "no-position" (state in which the shift position of the automatic transmission 4 cannot be identified since the shift lever is located between shift positions), the POSI value is "0".

The above FI/AT·ECU 12 is formed or implemented by a microcomputer including a RAM, a ROM, a CPU, and an I/O interface, none of which are shown, and controls the operation of the engine 3 and that of the automatic transmission 4. Connected to this FI/AT·ECU 12 are an engine rotational speed sensor 22 and an intake pipe absolute pressure sensor 23. The respective sensors 22, 23 sense an engine rotational speed NE and an intake pipe absolute pressure PBA, and deliver signals indicative of the sensed engine rotational speed NE and intake pipe absolute pressure PBA to the FI/AT·ECU 12.

The engine 3 has an output shaft 3a thereof connected to left and right front wheels W1, W2 as main drive wheels via the automatic transmission 4, a front differential 5 and front drive shafts 6, 6. Further, the output shaft 3a is connected to left and right rear wheels W3, W4 as auxiliary drive wheels via the automatic transmission 4, the front differential 5, a transfer 7a, a propeller shaft 7b, a rear differential 8, and left and right rear drive shafts 9, 9.

The rear differential 8 includes left and right electromagnetic clutches (clutch) 10, 10. Each of the electromagnetic clutches 10, 10 connects and disconnects the propeller shaft 7b to and from a corresponding one of the rear drive shafts 9 associated therewith. When the electromagnetic clutches 10, 10 disconnect the propeller shaft 7b from the rear drive shafts 9, all the torque from the engine 3 is transmitted to the front wheels W1, W2, whereby the vehicle is set to a front wheel drive mode. On the other hand, when the electromagnetic clutches 10, 10 connect the propeller shaft 7b to the rear drive shafts 9, 9, the torque of the engine 3 is also transmitted to the rear wheels W3, W4, whereby the vehicle is set to a four wheel drive mode. Further, the electromagnetic clutches 10, 10 are configured such that the engagement force of each of them is continuously changed in response to a drive signal from a 2/4WD·ECU 11, referred to hereinafter, whereby torques transmitted to the left and right rear wheels W3, W4 are controlled independently of each other.

The rear differential 8 is provided with an oil temperature sensor 24 which senses a temperature (oil temperature) TOIL of lubricating oil lubricating the electromagnetic clutches 10, 10, and delivers a signal indicative of the sensed oil temperature TOIL to the 2/4WD·ECU 11.

Further, wheel speed sensors 25 (wheel speed detection means) are mounted to each of the front and rear wheels W1 to W4. The four wheel speed sensors 25 are each comprised of a rotor and an electromagnetic pickup, and sense wheel speeds VW1 to VW4 of the wheels W1 to W4, respectively, and deliver signals indicative of the sensed wheel speeds VW1 to VW4 to an ABS·ECU 13. The ABS·ECU 13 is formed by a microcomputer, similarly to the FI/AT·ECU 12 described above, and carries out anti-lock control of the front and rear wheels W1 to W4.

On a dashboard, not shown, there is provided a lock switch 26. The lock switch 26 is provided for execution of a lock mode control for locking the rear differential 8. When it is depressed by the driver, a lock switch signal indicative of the depressed state is delivered to the 2/4WD·ECU 11.

The driving force control system 1 includes the 2/4WD·ECU (average wheel speed calculation means, first index calculation means, second index calculation means, clutch engagement force determination means, average wheel acceleration determination means, increasing correction means, vehicle speed calculation means, decreasing correction means, vehicle acceleration-calculating means, second decreasing correction means) 11. The 2/4WD·ECU 11 is formed by a microcomputer, similarly to the FI/AT·ECU 12 and the ABS·ECU 13, and connected to the ECU's 12, 13. The signals from the sensors 20 to 25 are input to the 2/4WD·ECU 11 by serial communication between the 2/4WD·ECU 11 and the ECU's 12, 13. In response to these signals and the above lock switch signal, the 2-4 WD·ECU 11 executes control programs read from the ROM, using values of flags and computational values, referred to hereinafter, stored in the RAM to calculate the driving forces (LSD torques TLSD) to be distributed or allocated to the rear wheels W3, W4, and the amounts of electric current to be supplied to the coils of the electromagnetic clutches 10, 10 commensurate with the respective driving forces, as described in the following, and supplies drive signals generated based on the results of the calculations to the electromagnetic clutches 10, 10 to thereby control the driving forces distributed or allocated to the rear wheels W3, W4.

Figure 2:
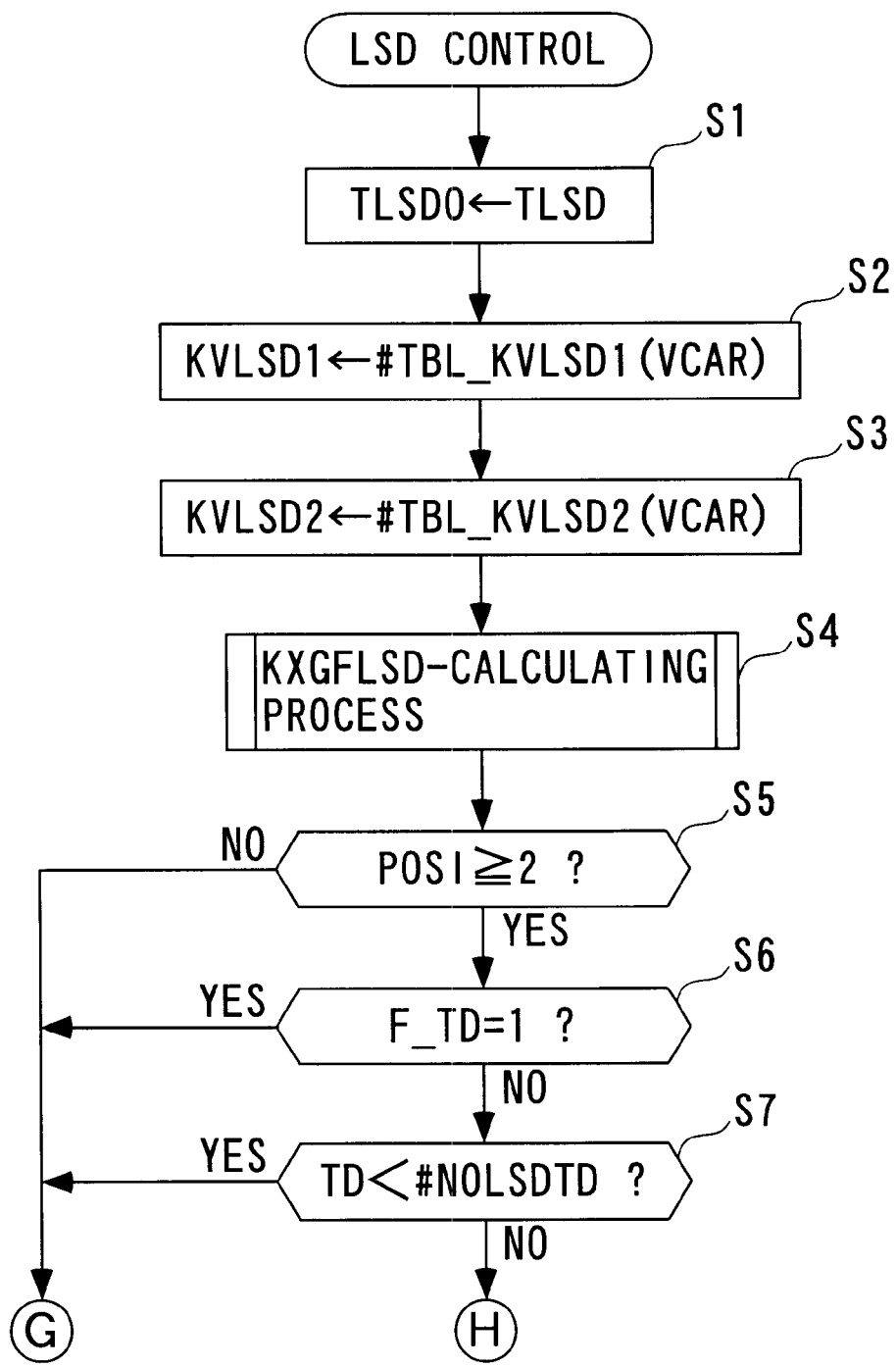
FIG. 2 is a flowchart showing a main routine for carrying out an LSD control process.
Figure 3:
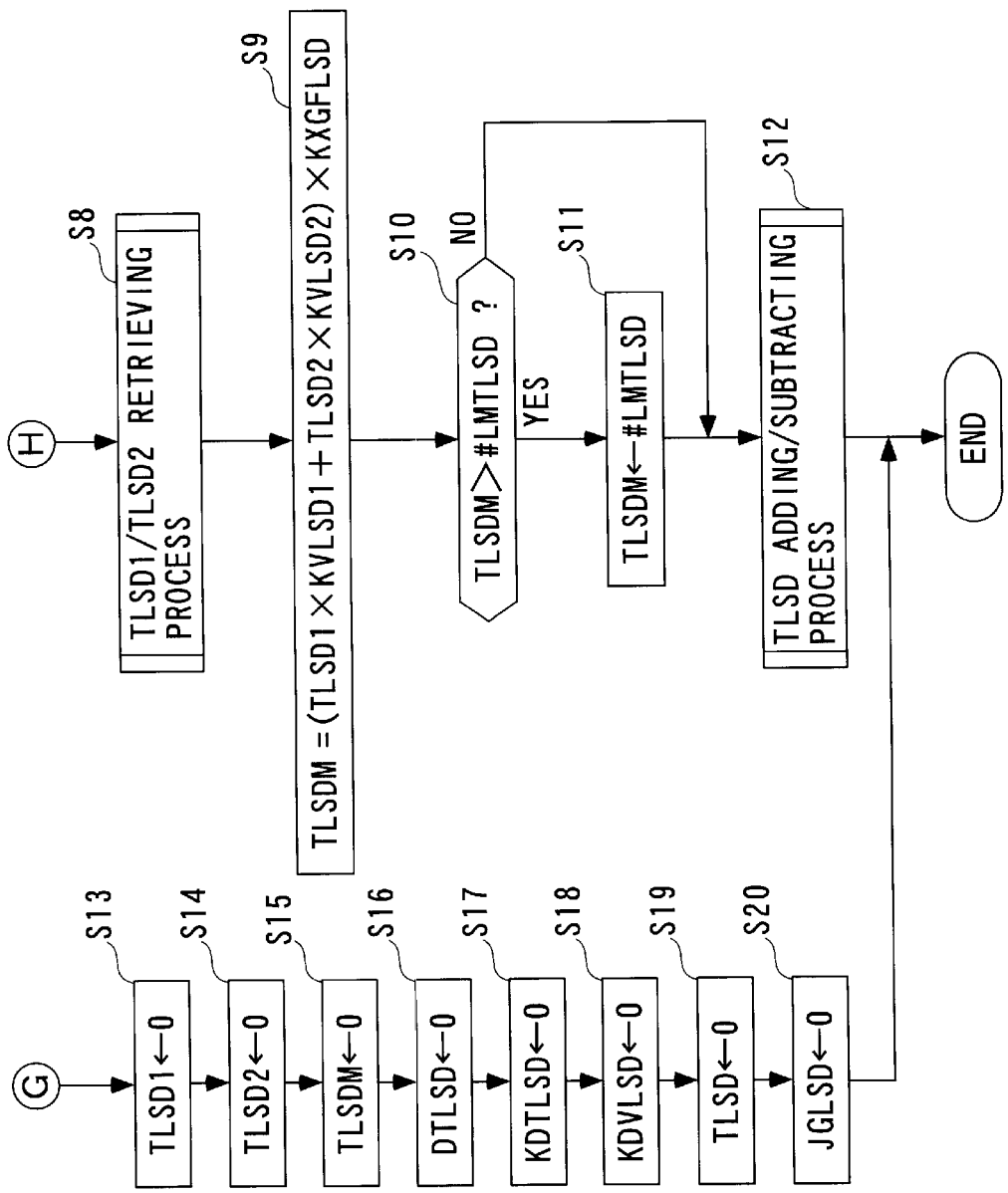
FIG. 3 is a continuation of the FIG. 2 flowchart.

In the following, the LSD control process executed by the 2/4WD·ECU 11 will be described. This process is executed to calculate the LSD torque TLSD (engagement force) based on the front-wheel and rear-wheel speeds VW1 to VW4, a drive torque TD, referred to hereinafter, and so forth. FIGS. 2 and 3 show a main routine for the LSD control process. As shown in the figures, in the process, first at a step S1, an LSD torque TLSD calculated in the immediately preceding loop is set to a preceding value TLSDO of the LSD torque.

Figure 4:
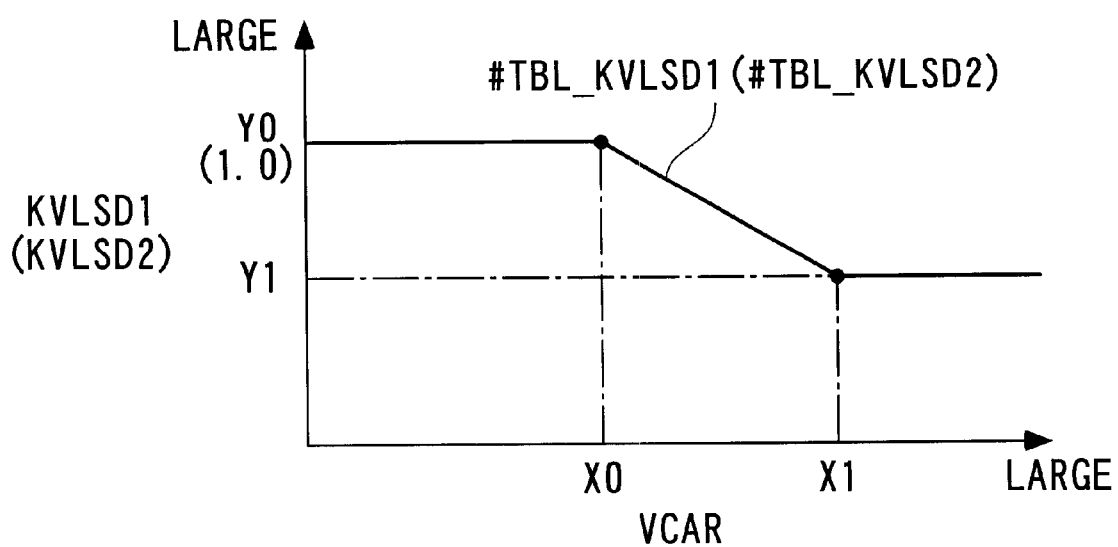
FIG. 4 is a diagram showing an example of a VCAR-KVLSD1 table.

Then, the program proceeds to a step S2, wherein a table value #TBL_KVLSD1 is retrieved from a VCAR-KVLSD1 table an example of which is shown in FIG. 4 according to the vehicle speed VCAR, and set to a TLSD1 correction coefficient KVLSD1. The vehicle speed VCAR is determined by correcting the smaller one of the left and right rear-wheel speeds VW3, VW4 in dependence on the accelerating or decelerating condition of the vehicle 2.

As shown in FIG. 4, in the VCAR-KVLSD1 table, the table value HTBL_KVLSD1 is set to a predetermined value Y0 (1.0) for a predetermined value X0 of the vehicle speed VCAR and values of the same smaller X0, and to a predetermined value Y1 smaller than the predetermined value Y0 for a predetermined value X1 of the vehicle speed VCAR and values of the same larger than X1. Further, the VCAR-KVLSD1 table is configured such that the table value #TBL_KVLSD1 linearly decreases as the vehicle speed VCAR increases from X0 to tX1. The reason for this is that as the vehicle speed VCAR increases, the front wheels W1, W2 as the main drive wheels are less prone to slip, so that smaller amounts of torque are required for driving the rear wheels W3, W4.

It should be noted that a curve or line plotted in this figure designates the table value #KVLSD1, and the symbol denoted as "#TBL_KVSLD1(VCAR)" represents the fact that the table value #TBL_KVSLD1 is determined according to the vehicle speed VCAR. This method of denotation also applies to other symbols in this and other flowcharts.

Then, the program proceeds to a step S3, wherein a table value #TBL_KVLSD2 is retrieved from a VCAR-KVLSD2 table configured similarly to the VCAR-KVLSD1 in FIG. 4, according to the vehicle speed VCAR, and set to a TLSD2 correction coefficient KVLSD2.

The VCAR-KVLSD2 table is configured similarly to the VCAR-KVLSD1 table in FIG. 4 such that the table value #TBL_KVLSD2 exhibits a similar tendency to the table value #TBL_KVLSD1 shown in FIG. 4 with respect to the vehicle speed VCAR, but each individual table value #TBL_KVLSD2 is different from a corresponding individual table value #TBL_KVLSD1. The reason for this is that, as described above, as the vehicle speed VCAR increases, the front wheels W1, W2 as the main drive wheels are less prone to slip, so that smaller amounts of torque are required for driving the rear wheels W3, W4.

Then, the program proceeds to a step S4, wherein a KXGFLSD-calculating process, described in detail hereinafter, is executed to calculate an acceleration-dependent LSD correction coefficient KXGFLSD.

Thereafter, the program proceeds to a step S5, wherein it is determined whether or not the POSI value is equal to or larger than 2. If the answer to the question is affirmative (YES), which means that the shift position is any of the "1" to "D5" and "R", the program proceeds to a step S6, wherein it is determined whether or not a drive torque flag F_TD assumes "1".

The drive torque flag F_TD is set to "1" when the drive torque TD, referred to hereinafter, is equal to 0 or smaller, that is, when the vehicle is in stoppage or decelerating, whereas it is set to "0" when the drive torque TD (required torque) is larger than 0, i.e. when the vehicle is accelerating.

If the answer to the question of the step S6 is negative (NO), i.e. if the vehicle is accelerating, the program proceeds to a step S7, wherein it is determined whether or not the drive torque TD is smaller than a predetermined value #NOLSDTD.

The drive torque TD (driving force of the main drive wheels) is calculated based on the engine torque output from the engine 3, as the torque output to the output shaft side of the automatic transmission 4. More specifically, it is calculated as a value of the engine torque corrected by using a torque converter amplification factor, a gear ratio and inertia-dependent correction torque, and the like.

If the answer to the question of the step S7 is negative (NO), i.e., if TD≧#NOLSDTD, the program proceeds to a step S8 in FIG. 3, wherein first and second LSD torques TLSD1, TLSD2 (engagement forces) are determined by a TLSD1/TLSD2 retrieving process described in detail hereinafter.

Then, the program proceeds to a step S9, wherein a desired LSD torque value TLSDM is calculated by using the following equation (1):

$$TLSDM=(TLSD1 \times KVLSD1+TLSD2 \times KVLSD2) \times KXGFLSD \quad (1)$$

At the following steps 10, 11, limit-checking of the desired LSD torque value TLSDM obtained as above is carried out. More specifically, it is determined at the step S10 whether or not the desired LSD torque value TLSDM is larger than an upper limit value #LMTLSD, and if TLSDM≧#LMTLSD, the program proceeds to the step 511, wherein the desired LSD torque value TLSDM is set to the upper limit value #LMTLSD.

On the other hand, if TLSDM≦#LMTLSD at the step S10, the step S11 is skipped.

After execution of the limit-checking process at the steps S10, S11, the LSD torque TLSD is calculated by a TLSD adding/subtracting process, described in detail hereinafter, at a step S12, followed by terminating the program.

If the answer to the question of the step S5 is negative (NO), i.e., if POSI=1 or 0 holds, which means that the shift position is "N" or "P" or the shift lever is in no-position, the first LSD torque TLSD1, the second LSD torque TLSD2 and the desired LSD torque value TLSDM are set to 0 at respective steps S13 to S15.

Then, at steps S16 to 20, a difference DTLSD, first and second addition/subtraction adjusting coefficients KDTLSD and KDVLSD, the LSD torque TLSD, and a front-wheel/rear-wheel slip ratio threshold JGLSD are set to 0, respectively, followed by terminating the program. The difference, coefficients and threshold are described in detail hereinafter.

Figure 5:
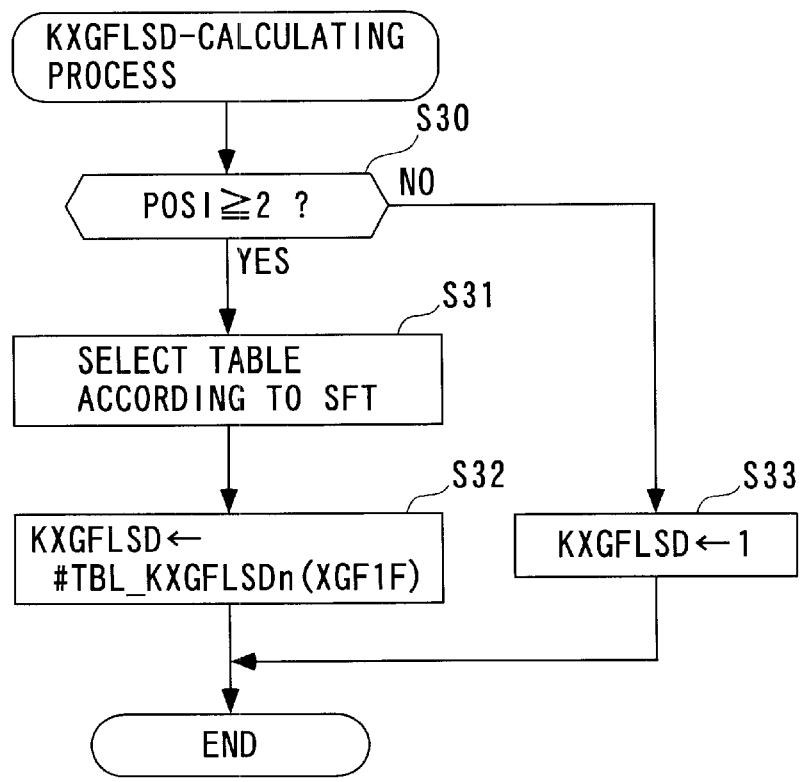
FIG. 5 is a flowchart showing a routine for carrying out a KXGFLSD-calculating process.

In the following, the KXGFLSD-calculating process executed at the step S4 will be described in detail with reference to FIG. 5. As described below, the process is executed to calculate the acceleration-dependent LSD correction coefficient KXGFLSD based on the POSI value, the SFT value, and the filtered vehicle acceleration XGF1F. First, it is determined at a step S30 whether or not the POSI value is equal to or larger than 2.

If the answer to the question is affirmative (YES), which means that the shift position is one of "1" to "D5" and "R", the program proceeds to a step S31, wherein one of XGF1F-

Figure 6:
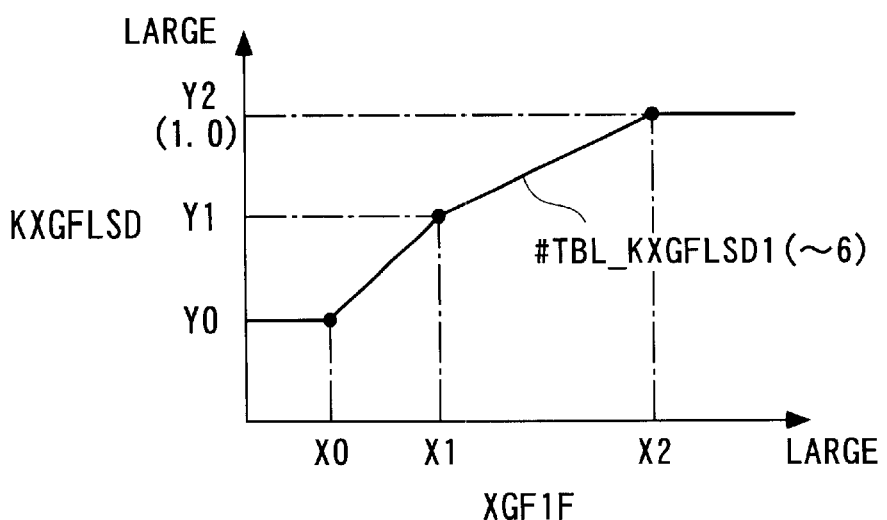
FIG. 6 is a diagram showing an example of a XGF1F-KXGFLSD1 table.

KXGFLSDn tables (n=1 to 6) an example of which is shown in FIG. 6 is selected according to the SFT value. Then, at the following step S32, a table value #TBL_KXGFLSDn is retrieved from the selected XGF1F-KXGFLSDn table according to the filtered vehicle acceleration XGF1F, and set to the acceleration-dependent LSD correction coefficient KXGFLSD, followed by terminating the program.

The filtered vehicle acceleration XGFIF (acceleration) is determined by calculating a vehicle acceleration XGF based on the drive torque TD, the weight of the vehicle 2, the diameter of the wheels, and running resistance of the vehicle 2, and subjecting the vehicle acceleration XGF to predetermined filtering processing. In other words, the filtered vehicle acceleration XGIF is calculated as an extra vehicle acceleration for actually accelerating the vehicle 2, and hence properly reflects an actual accelerating condition of the vehicle 2.

AS the XGF1F-KXGFLSDn tables for selection at the step S31, there are provided six tables for the respective first to fifth speed gear positions and reverse gear position in a manner corresponding respectively to the SFT values 1 to 6. FIG. 6 shows the XGF1F-KXGFLSDn table for the first speed gear position. As shown in the figure, the table value #TBL_KXGFLSD1 is set to a predetermined value Y0 for a predetermined speed X0 of the filtered vehicle acceleration XGF1F and values of the same smaller than X0, and to a predetermined value Y2 (1.0) larger than the predetermined value Y0 for a predetermined speed X2 of the filtered vehicle acceleration XGF1F and values of the same larger than X2. Further, the XGF1F-KXGFLSDn table is configured such that the table value #TBL_KXGFLSD1 decreases as the filtered vehicle acceleration XGF1F decreases from X2 to X0.

The table value #TBL_KJXGFLSD1 is set as described above so as to decrease the LSD torque TLSD when acceleration of the vehicle 2 is not required, e.g., during release of the accelerator pedal. Further, the LSD torque TLSD is calculated, as described hereinafter, based on parameters indicative of speeds and accelerations of the wheels W1 to W4 besides the acceleration-dependent LSD correction coefficient KXGFLSD, so that if the LSD torque TLSD is calculated without using the acceleration-dependent LSD correction coefficient KXGFLSD, the output torque from the engine 3, i.e., a parameter indicative of the drive torque for driving the wheels W1 to W4 is omitted, which may cause disagreement between the LSD torque TLSD and torque required for the acceleration of the vehicle 2. For this reason, the table value #TBL_KXGFLSD1 is set as above for proper distribution of the LSD torque TLSD to the rear wheels W3, W4 which agrees with torque required for the acceleration of the vehicle 2. Thus, for example, when the accelerator pedal is not stepped on the surface resistance $\mu$ of a road is small, and hence the filtered vehicle acceleration XGF1F is low, it is possible to prevent a larger LSD torque TLSD than a torque required for acceleration of the vehicle 2 from being distributed to the rear wheels W3, W4. As a result, slip of the rear wheels W3, W4 caused by such excessively large torque can be prevented. In short, it is possible to correct the LSD torque TLSD properly according to the surface resistance $\mu$ of the road.

Further, the XGF1F-KXGLSDn tables are configured similarly to each other such that the table values #TBL_KXGLSDn generally exhibit a similar tendency with respect to the filtered vehicle acceleration XGF1F, but at the same time are different from each other in that in a XGF1F-KXGLSDn table for a higher gear position, each individual table value #TBL_KXGLSDn is smaller than a corresponding one in a XGF1F-KXGLSDn table for a lower gear position, with respect to an identical filtered vehicle acceleration XGF1F. The reason for this is that as the gear position is one for lower vehicle speeds, the inertial mass of the output-side gears and a demand by the driver for acceleration are larger, and hence a larger torque is required for driving the rear wheels W3, W4.

On the other hand, if the answer to the question of the step S33 is negative (NO), i.e., if the shift position is "N" or "P", or in no-position, the acceleration-dependent LSD correction coefficient KXGFLSD is set to 1 at a step S33, followed by terminating the program.

Figure 7:
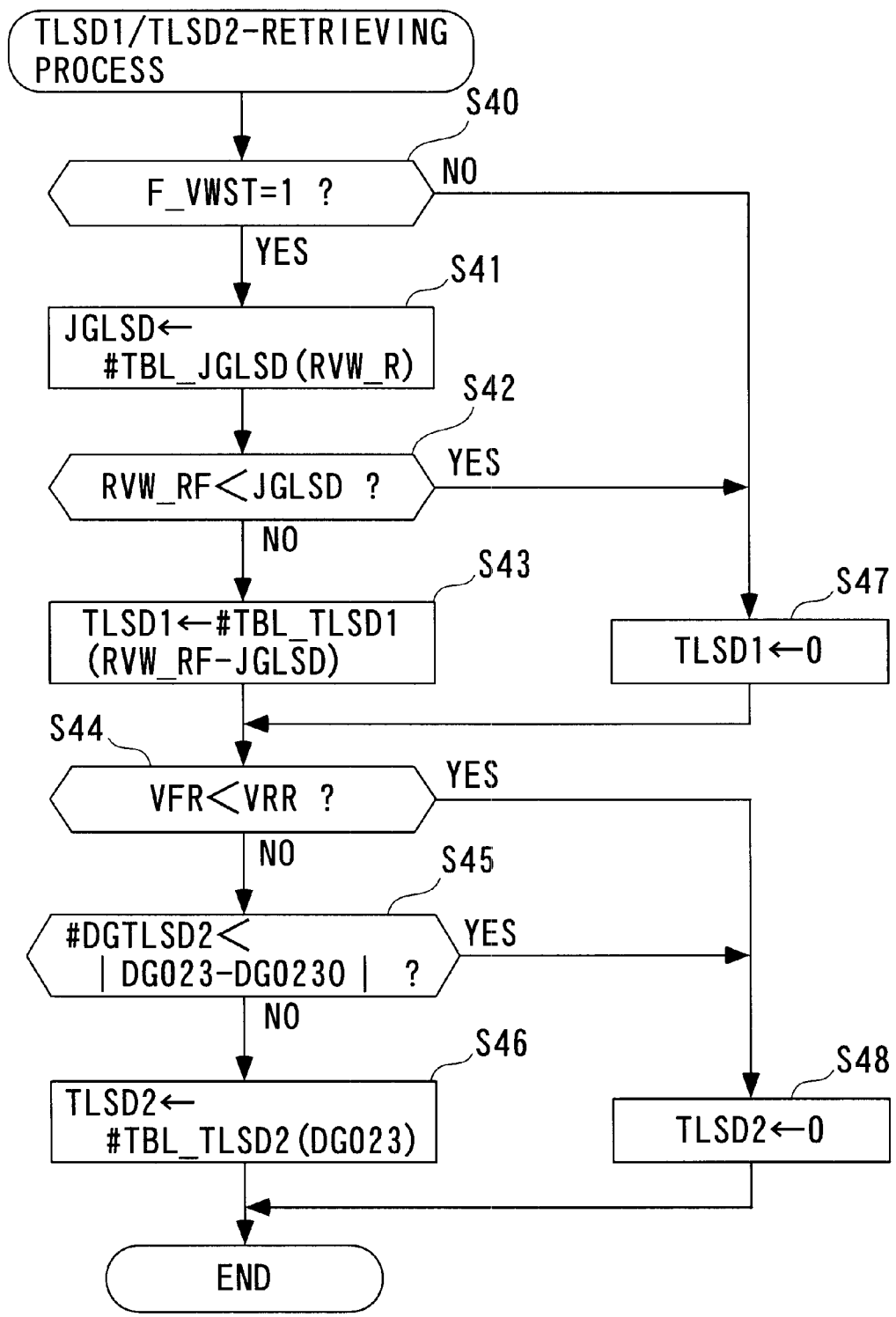
FIG. 7 is a flowchart showing a routine for carrying out a TLSD1/TLSD2-retrieving process.

Next, the TLSD1/TLSD2 retrieving process executed at the step S8 will be described in detail with reference to FIG. 7. As shown in the figure, in the process, first, it is determined at a step S40 whether or not a running flag F_VWST assumes "1". The running flag F_VWST is set to "1" when the front-wheel and rear-wheel speeds VW1 to VW4 are all equal to or higher than a predetermined speed (e.g. 5 km/h), which means that the vehicle 2 is running, and set to "0" otherwise, i.e., when the vehicle 2 is not running or in similar conditions.

Figure 8:
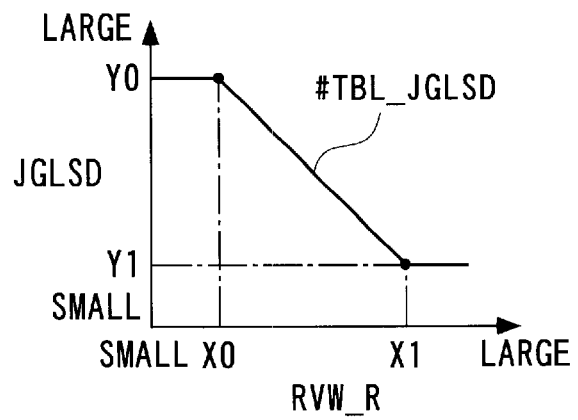
FIG. 8 is a diagram showing an example of an RVW_R-JGLSD table.

If the answer to the question is affirmative (YES), i.e., if the vehicle is running, the program proceeds to a step 541, wherein a table value HTBL_JGLSD is retrieved from an RVW_R-JGLSD table an example of which is shown in FIG. 8 according to a left/right rear-wheel speed ratio RVW_R and set to the front-wheel/rear-wheel slip ratio threshold JGLSD (second index). The left/right rear-wheel speed ratio RVWR (second index) is determined by dividing the smaller one of respective values of the left and right rear-wheel speeds VW3 and VW4 by the larger one of the values, and converting the thus obtained value or quotient to a percentage. More specifically, when VW3<VW4 holds, RVW_R is equal to (VW3/VW4)×100 (%), while when VW3>VW4 holds, RVW_R is equal to (VW4/VW3)×100 (%). Further, when VW3=VW4 holds RVW_R is equal to 100 (%).

As shown in FIG. 8, in the RVW_R_JGLSD table, the table value #TBL_JGLSD is set to a predetermined value Y0 (1.0) for a predetermined value X0 of the left/fight rear-wheel speed ratio RVW_R or values of the same smaller X0, and to a predetermined value Y1 smaller than the predetermined value Y0 for a predetermined value X1 of the left/fight rear-wheel speed ratio RVW_R or larger values of the same larger than X1. Further, the RVW_R-JGLSD table is set such that the table value #TBL_JGLSD linearly increases as the left/fight rear-wheel speed ratio RVW_R decreases from X1 to X0. The table value #TBL_JGLSD is thus set so as to reduce the first LSD torque TLSD1 or part of torque to be distributed to the rear wheels W3, W4, which is determined at a step S43, referred to hereinafter, as the left/fight rear-wheel speed ratio RVW_R becomes larger, i.e., as the difference in speed between the rear wheels W3 and W4 becomes larger.

Then, the program proceeds to a step S42, wherein it is determined whether or not the front-wheel/rear-wheel slip ratio threshold JGLSD obtained at the step S41 is larger than a front-wheel/rear-wheel slip ratio RVW_RF. The ratio RVW_RF (first index) is obtained by dividing an average rear-wheel speed VRR by an average front-wheel speed VFR and converting the thus obtained value or quotient to a percentage (RVW_RF=(VRR/VFR)×100 (%)). Further, the average front wheel speed VFR (average wheel speed of main drive wheels) is determined by averaging left and right filtered front wheel speeds FVW1, FVW2 obtained by subjecting the left and right front wheel speeds VW1, VW2 to a predetermined filtering process. Similarly, the average rear wheel speed VRR (average wheel speed of auxiliary drive wheels) is determined by averaging left and right filtered rear wheel speeds FVW3, FVW4 obtained by subjecting the left and right rear wheel speeds VW3, VW4 to a predetermined filtering process.

Although in the present embodiment, at the step S42, the front-wheel/rear-wheel slip ratio threshold JGLSD is determined according to the left/right rear-wheel speed ratio RVW__R, this is not limitative but the difference between the left and right rear-wheel speeds VW3 and VW4 may be used in place of the left/right rear-wheel speed ratio RVW__R to determine the front-wheel/rear-wheel slip ratio threshold JGLSD.

Figure 9:
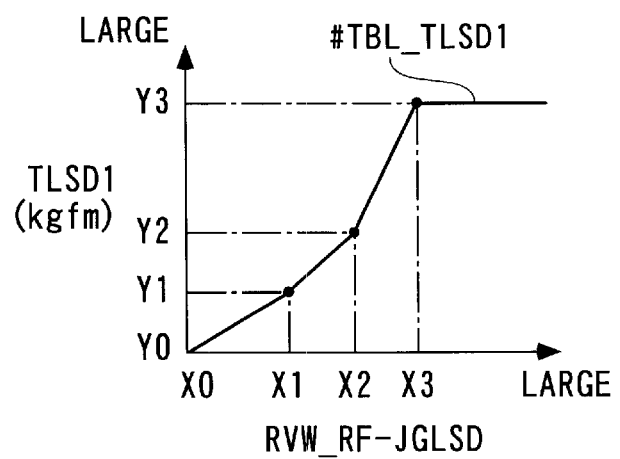
FIG. 9 is a diagram showing an example of an [RVW_RF-JCLSD]-TLSD1 table.

If the answer to the question of the step S42 is negative (NO), i.e., if RVW__RF≧JGLSD, the program proceeds to a step S43, wherein a table value #TBL__TLSD1 is retrieved from an [RVW__RF-JGLSD]-TLSD1 table, an example of which is shown in FIG. 9 according to the difference between the front-wheel/rear-wheel slip ratio RVW__RF and the front-wheel/rear-wheel slip ratio threshold JGLSD (value indicative of the relative relationship in magnitude between the first index and the second index) land set to the first LSD torque TLSD1.

As shown in FIG. 9, in the [RVW__RF-JGLSD]-TLSD1 table, the table value #TBL__TLSD1 is set to a predetermined value Y3 for a predetermined value X3 of the difference [RVW__RF-JGLSD] and values of the same larger than X3. Further, the [RVW__RF-JGLSD]-TLSD1 table is set such that the table value #TBL__TLSD1 decreases as the difference [RVW__RF-JGLSD] decreases from X3 to X0. The table value #TBL__TLSD1 is thus set so as to reduce the first LSD torque TLSD1 or part of torque to be distributed to the rear wheels W3, W4 as the difference [RVW__RF-JGLSD] becomes smaller, i.e., as the difference in speed between the rear wheels W3 and W4 becomes larger, thereby preventing occurrence of a tight turn braking phenomenon.

Although in the above embodiment, at the step S43, the first LSD torque TLSD1 is determined according to the difference [RVW__RF-JGLSD], this is not limitative but a ratio (RVW__RF/JGLSD) between the front-wheel/rear-wheel slip ratio RVW__RF and the front-wheel/rear-wheel slip ratio threshold JGLSD may be used in place of the difference [RVW__RF-JGLSD] to determine the first LSD torque TLSD1.

Then, the program proceeds to a step 44, wherein it is determined whether or not the average front-wheel speed VFR is lower than the average rear-wheel speed VRR. If the answer to the question is negative (NO), i.e. if VFR≧VRR, the program proceeds to a step S45, wherein it is determined whether or not the absolute value of the difference |DG023-G023O| between the difference DG023 (=G02-G03) between an average front-wheel acceleration G02 and an average rear-wheel acceleration G03 and the immediately preceding value of the difference DG023 is larger than a predetermined threshold #DGTLSD2.

It should be noted that the average front-wheel acceleration G02 (average wheel acceleration of main drive wheels) is calculated by calculating a left front wheel acceleration G0L from the difference between the present value VW1n and the immediately preceding value VW1n−1 of the left front wheel speed VW1, and similarly a right front wheel acceleration G0R, and averaging the left front wheel acceleration G0L and the right front wheel acceleration G0R. Similarly to this, the average rear-wheel acceleration G03 (average wheel acceleration of auxiliary drive wheels) is calculated.

Figure 10:
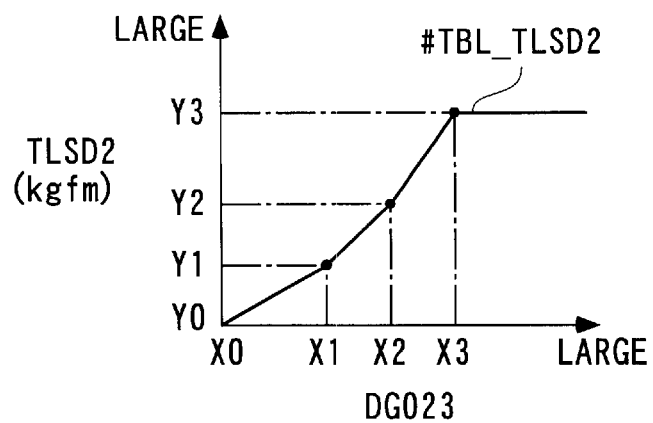
FIG. 10 is a diagram showing an example of a DG023-TLSD2 table.

If the answer to the question of the step S45 is negative (NO), i.e., if |DG023−DG023O|≦#DGTLSD2, the program proceeds to a step S46, wherein a table value #TBL__TLSD2 is retrieved from a DG023-TLSD2 table an example of which is shown in FIG. 10 according to the difference DG023, and set to the second LSD torque TLSD2, followed by terminating the program.

As shown in FIG. 10, in the DG023-TLSD2 table, the table value #TBL__TLSD2 is set to a predetermined value Y3 for a predetermined value X3 of the difference DG023 and values of the same larger than X3. Further, the DG023-TLSD2 table is configured such that the table value #TBL__TLSD2 increases as the difference DG023 increases from X0 to X3. The table value #TBL__TLSD2 is thus set so as to increase the second LSD torque TLSD2 or part of torque to be distributed to the rear wheels W3, W4 as the difference DG023 is larger, i.e., as the extent to which the average front-wheel acceleration G02 exceeds the average rear-wheel acceleration G03 increases, thereby enhancing the response of slippage-eliminating control carried out on the front wheels W1, W2.

Although in the present embodiment, at the step S46, the second LSD torque TLSD2 is determined based on the difference DG023, this is not limitative but a ratio (G02/G03) between the average front-wheel acceleration G02 and the average rear-wheel acceleration G03 may be used in place of the difference DG023 to determine the second LSD torque TLSD2.

On the other hand, if the answer to the question of the step S40 is negative (NO), or if the answer to the question of the step S42 is affirmative (YES), the first LSD torque TLSD1 is set to 0 at a step S47, followed by the program proceeding to the steps S44 et seq. More specifically, when the vehicle 2 is in stoppage or running straight, the first LSD torque TLSD1 is not distributed to the rear wheels W3, W4.

If the answer to the question of the step S44 or S45 is affirmative (YES), the second LSD torque TLSD2 is set to 0 at a step S48, followed by terminating the program. More specifically, if VRF≧VRR, which means that the front wheels W1, W2 are slipping, or if the absolute value of the difference |DG023−DG023O #DGTSLD2, which means that the absolute value of the difference |DG023−DG023O| is so large as will cause a torque step (stepped increase in torque), the second LSD torque TLSD2 is not distributed to the rear wheels W3, W4.

Next, the TLSD adding/subtracting process executed at the step S12 will be described. In this process, the LSD torque TLSD is calculated, based on the desired LSD torque value TLSDM determined at the step S11, by using the following equation (2):

$$TLSD = TLSDO + KDTLSD \times KVTLSD \times DTLSD \qquad (2)$$

wherein DTLSD represents the difference (=TLSDM−TLSDO) between the desired LSD torque value TLSDM and the immediately preceding value TLSDO of the LSD torque TLSD. When TLSDM>TLSDO, the difference DTLSD assumes a positive value, whereas when TLSDM<TLSDO, it assumes a negative value. Further, when TLSDM=TLSDO, the difference DTLSD is equal to 0. Accordingly, when TLSDM≠TLSDO, the second term KDTLSD×KVTLSD DTLSD on the right side of the equation (2) is added to or subtracted from the immediately preceding value TLSDO depending on whether the difference DTLSD assumes a positive value or a negative value.

Figure 11:
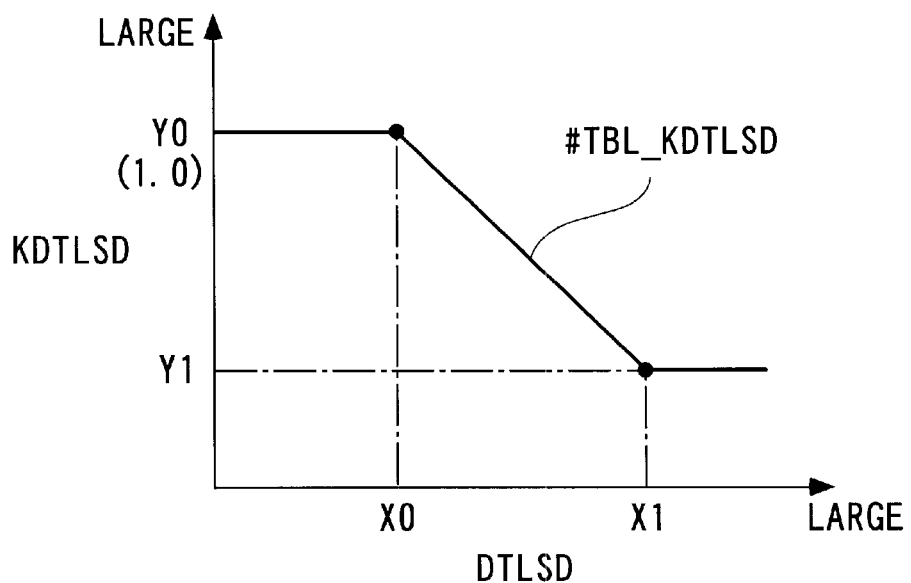
FIG. 11 is a diagram showing an example of a DTLSD-KDTLSD table.

Further, the first addition/subtraction adjusting coefficient KDTLSD is set to a table value #TBL__KDLSD retrieved from a DTLSD-KDTLSD table an example of which is shown in FIG. 11 according to the difference DTLSD. As shown in the figure, the table value #TBL_KDTLSD is set to a predetermined value Y0 (1.0) for a predetermined value X0 of the difference DTLSD or values of the same smaller than X0, and to a predetermined value Y1 smaller than the predetermined value Y0 for a predetermined value X1 of the difference DTLSD and values of the same larger than X1. Further, the DTLSD-KDTLSD table is configured such that the table value #TBL_KDTLSD linearly decreases as the difference DTLSD increases from X0 to X1. The table value #TBL_KDTLSD is thus set so as to prevent occurrence of a large torque step because the torque step becomes larger as the difference DTLSD becomes larger.

There are two kinds of DTLSD-KDTLSD tables provided for selection in dependence on whether the difference DTLSD is positive or negative. The two kinds of DTLSD-KDTLSD tables are configured similarly to each other such that the table values "#TBL_KDLSD exhibit similar tendency, but each individual table value #TBL_KDLSD is different from a corresponding individual table value #TBL_KDLSD.

Figure 12:
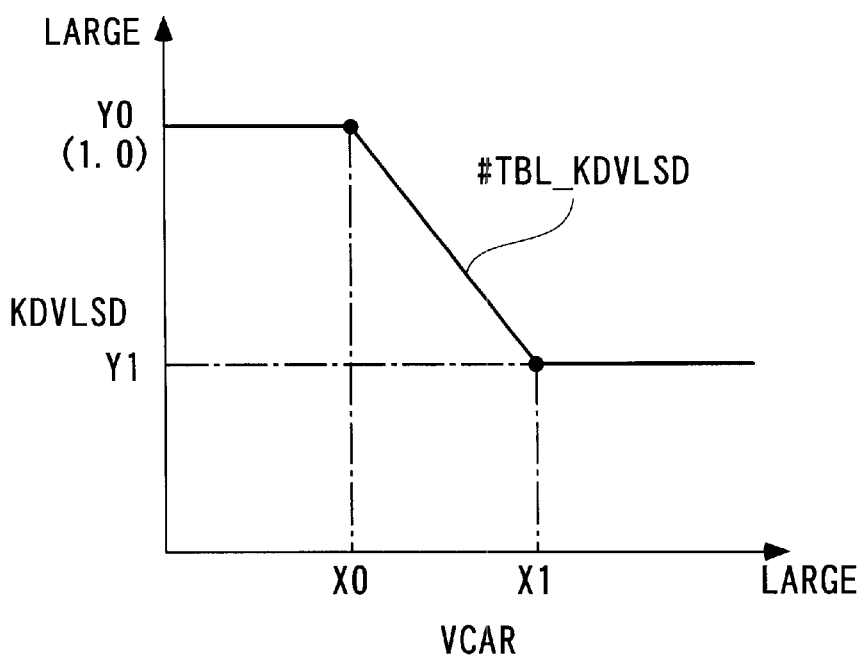
FIG. 12 is a diagram showing an example of a VCAR-KVTLSD table.

On the other hand, the second addition/subtraction adjusting coefficient KVTLSD is set to a table value #TBL_KVLSD retrieved from a VCAR-KDTLSD table an example of which is shown in FIG. 12 according to the vehicle speed VCAR. As shown in the figure, the table value #TBL_KVTLSD is set to a predetermined value Y0 (1.0) for a predetermined speed X0 of the vehicle speed VCAR and values of the same smaller than X0, and a predetermined value Y1 smaller than the predetermined value Y0 for a predetermined speed X1 of the vehicle speed VCAR and values of the same larger than X1. Further, the VCAR-KDTLSD table is configured such that the table value #TBL_KVTLSD linearly decreases as the vehicle speed VCAR increases from X0 to X1. The table value #TBL_KVTLSD is thus set so as to prevent occurrence of a large torque step since the torque step becomes larger as the vehicle speed VCAR becomes higher.

According to the driving force control system of the above embodiment, the LSD torque TLSD is calculated based on the first LSD torque TLSD1, the second LSD torque TLSD2, and the acceleration-dependent LSD correction coefficient KXGFLSD. When the first LSD torque TLSD1 for use in the calculation of the LSD torque TLSD is calculated, the difference [RVW_RF-JGLSD] is determined based on the wheel speeds VW1 to VW4 detected by the wheel speed sensors 25, and the first LSD torque TLSD1 is calculated such that it assumes a smaller value as the difference [RVW_RF-JGLSD] is smaller, i.e., as the difference in speed between the left and right rear wheels VW3, VW4 is larger. As a result, the engagement forces of the left and right electromagnetic clutches 10, 10 can be set such that even when a tight turn braking force acts on the vehicle 2 when the vehicle 2 is performing cornering at a relatively low-speed on a road surface having a high frictional resistance, e.g., on a paved road surface, one of the rear wheels W3, W4 is inhibited from rotating by the braking force, while the other is allowed to rotate with slip of the associated clutch, whereby it is possible to prevent occurrence of tight turn braking phenomenon. As a result, the above-mentioned advantageous effects can be obtained by using only the wheel speed sensors 25, and omitting the use of sensors conventionally used, such as a steering angle sensor, a yaw rate sensor, and a lateral acceleration sensor, whereby manufacturing costs can be reduced.

Further, when the second LSD torque TLSD2 is calculated, the second LSD torque TLSD2 to be distributed to the rear wheels W3, W4 is set to a larger value as the difference DG023 is larger, i.e., as the extent to which the average front-wheel acceleration G02 exceeds the average rear-wheel acceleration G03 is larger, causing an increased amount of slip of the front wheels W1, W2. That is, the slippage-eliminating control for the front wheels W1, W2 can be carried out based on the difference DG023 between the average front-wheel acceleration G02 and the average rear-wheel acceleration G03, which reflects a slipping state of the front wheels W1, W2 on more of a real time basis, so that it is possible to enhance the response of the slippage-eliminating control compared with the prior art in which the slippage-eliminating control is started after detection of a difference in speed between the main drive wheels and the auxiliary drive wheels.

Further, the TLSD1 correction coefficient KVLSD1 and the TLSD2 correction coefficient KVLSD2 for multiplying the respective first and second LSD torques TLSD1 and TLSD2 are set such that each of the coefficients KVLSD1 and KVLSD2 is linearly reduced as the vehicle speed VCAR increases from the predetermined value X0 to the predetermined value X1. Therefore, torque to be distributed to the rear wheels W3, W4 is controlled such that it becomes smaller as the vehicle speed VCAR increases. In the four-wheel drive vehicle 2, in general, as the vehicle speed VCAR becomes larger, the front wheels W1, W2 are less prone to slip, and hence the amounts of the torque required for driving the rear wheels W3, W4 are decreased. Therefore, the above control makes it possible to make the operating state of the vehicle 2 progressively closer to the front-wheel drive mode as the torque for driving the rear wheels W3, W4 decreases. As a result, it is possible to reduce the size of the driving system of the vehicle 2 including the electromagnetic clutches 10, 10. Further, because the operating state of the vehicle 2 becomes closer to the two-wheel drive mode as the vehicle speed VCAR becomes higher, it is possible to reduce the rotational resistance of the driving system by an extent that the operating state of the vehicle becomes closer to the two-wheel drive mode, thereby improving the fuel economy of the engine.

Moreover, between the predetermined values X0 and X2 of the filtered vehicle acceleration XGF1F, as the filtered vehicle acceleration XGF1F decreases, the acceleration-dependent LSD correction coefficient KXGFLSD is set to a smaller value. Further, the acceleration-dependent LSD correction coefficient KXGFLSD is set such that the correction coefficient KXGFLSD assumes a larger value for a lower-speed gear position than for a higher-speed gear position with respect to an identical value of the filtered vehicle acceleration XGF1F. As a result, when acceleration is not demanded, e.g., during release of the accelerator pedal, the LSD torque TLSD can be decreased accordingly. Further, it is also possible to increase the LSD torque TLSD as the gear position is one for lower vehicle speeds, i.e., as larger amounts of the torque are required for driving the rear wheels W3, W4 with an increase in the inertial mass of the output-side gears and the driver's demand for acceleration. In addition, because the acceleration-dependent LSD correction coefficient KXGFLSD can be obtained based on the filtered vehicle acceleration XGF1F determined based on the drive torque TD, it is possible to determine the LSD torque TLSD as an appropriate value commensurate with a torque demanded by the acceleration of the vehicle 2. Thus, differently from the prior art in which the LSD torque TLSD is determined, e.g., from the difference in speed between the front and rear wheels, the present embodiment makes it possible to prevent the LSD torque TLSD from exceeding the torque demanded by the acceleration of the vehicle 2, thereby preventing the slip of the rear wheels W3, W4 on a road having a small surface resistance $\mu$ as described herein above.

Further, the present invention is not limited to the above-described embodiment, but it can be put into practice in various forms. For instance, in the above embodiment, the invention is applied, by way of example, to the driving force control system for a part-time four-wheel-drive vehicle with a front-wheel drive mode as its main drive mode, this is not limitative, but similarly, the invention can be also applied to a part-time four-wheel-drive vehicle with a rear-wheel drive mode as its main drive mode. Further, for the clutches controlling the transmission of torque to the rear wheels W3, W4, there may be employed any suitable clutch, so long as it serves as the clutch, including a hydraulic clutch.

It is further understood by those skilled in the art that the foregoing is a preferred embodiment of the invention, and that various changes and modifications may be made without departing from the spirit and scope thereof.

What is claimed is:

1. A driving force control system for a four-wheel drive vehicle including a pair of front wheels, a pair of rear wheels, an engine, a transmission for connecting one of said pair of front wheels and said pair of rear wheels to said engine, as main drive wheels, and left and right clutches for connecting another of said pair of front wheels and said pair of rear wheels to said main drive wheels, as left and right auxiliary drive wheels, respectively, the driving force control system controlling the engagement force of each of said left and right clutches to thereby control distribution of a driving force of said main drive wheels to said auxiliary left and right wheels, the driving force control system comprising:

wheel speed detection means for detecting wheel speeds indicative of respective rotational speeds of said front and rear wheels;

average wheel speed calculation means for calculating an average wheel speed of said main drive wheels and an average wheel speed of said auxiliary drive wheels, based on the detected wheel speeds;

first index calculation means for determining a first index representative of a relative relationship in magnitude between said average wheel speed of said main drive wheels and said average wheel speed of said auxiliary drive wheels;

second index calculation means for calculating a second index representative of a relative relationship in magnitude between said wheel speeds of said left and right auxiliary wheels; and clutch engagement force determination means for determining respective engagement forces of said left and right clutches, in dependence on a relative relationship in magnitude between said first index and said second index.

2. A driving force control system according to claim 1, further including average wheel acceleration-calculating means for calculating an average wheel acceleration of said main drive wheels and an average wheel acceleration of said auxiliary drive wheels based on the detected wheel speeds; and increasing correction means for increasing said engagement forces of said left and right clutches, when the calculated average wheel acceleration of said main drive wheels is larger than the calculated average wheel acceleration of said auxiliary drive wheels.

3. A driving force control system according to claim 2, wherein said increasing correction means increases said engagement forces of said left and right clutches according to an extent by which the calculated average wheel acceleration of said main drive wheels exceeds the calculated average wheel acceleration of said auxiliary drive wheels.

4. A driving force control system according to claim 1, further including vehicle speed calculation means for calculating a vehicle speed of said four-wheel drive vehicle based on the detected wheel speeds; and decreasing correction means for decreasing said engagement forces of said left and right clutches as the calculated vehicle speed increases.

5. A driving force control system according to claim 2, further including vehicle speed calculation means for calculating a vehicle speed of said four-wheel drive vehicle based on the detected wheel speeds; and decreasing correction means for decreasing said engagement forces of said left and right clutches as the calculated vehicle speed increases.

6. A driving force control system according to claim 1, further including vehicle acceleration-calculating means for calculating a vehicle acceleration of said four-wheel drive vehicle based on said driving force of said main drive wheels; and second decreasing correction means for decreasing said engagement forces of said left and right clutches as the calculated vehicle acceleration decreases.

7. A driving force control system according to claim 2, further including vehicle acceleration-calculating means for calculating a vehicle acceleration of said four-wheel drive vehicle based on said driving force of said main drive wheels; and second decreasing correction means for decreasing said engagement forces of said left and right clutches as the calculated vehicle acceleration decreases.

8. A drive force control system according to claim 6, including gear position detection means for detecting a gear position of said transmission, and wherein said second decreasing correction means decreases said engagement forces of said left and right clutches as the detected gear position increases in number for higher speeds.

* * * * *